United States Patent
Guner et al.

(10) Patent No.: US 12,460,531 B2
(45) Date of Patent: Nov. 4, 2025

(54) SUBSURFACE FORMATION RADIAL PROFILING USING COMBINED PROCESSING OF OMNI-DIRECTIONAL AND PAD-TYPE TOOLS

(71) Applicant: Halliburton Energy Services, Inc., Houston, TX (US)

(72) Inventors: Baris Guner, Houston, TX (US); Ahmed E. Fouda, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/664,109

(22) Filed: May 19, 2022

(65) Prior Publication Data

US 2023/0374896 A1   Nov. 23, 2023

(51) Int. Cl.
  *G01V 3/28* (2006.01)
  *E21B 47/002* (2012.01)
  *G01V 3/38* (2006.01)

(52) U.S. Cl.
  CPC ............ *E21B 47/0025* (2020.05); *G01V 3/28* (2013.01); *G01V 3/38* (2013.01); *E21B 2200/20* (2020.05)

(58) Field of Classification Search
  CPC .... E21B 47/0025; E21B 47/002; E21B 47/00; E21B 2200/20; E21B 2200/00; G01V 3/28; G01V 3/26; G01V 3/38; G01V 3/18; G01V 3/00
  See application file for complete search history.

(56) References Cited

U.S. PATENT DOCUMENTS

| | | | |
|---|---|---|---|
| 3,993,944 A | 11/1976 | Meador et al. | |
| 6,925,384 B2 | 8/2005 | Frenkel et al. | |
| 9,081,114 B2* | 7/2015 | Nie | G01V 3/24 |
| 2005/0116709 A1* | 6/2005 | Proett | G01N 24/081 |
| | | | 324/303 |
| 2006/0031017 A1* | 2/2006 | Mathieu | G01V 3/38 |
| | | | 702/6 |
| 2009/0085570 A1 | 4/2009 | Signorelli et al. | |
| 2010/0097067 A1 | 4/2010 | Synder, Jr. et al. | |
| 2012/0192640 A1* | 8/2012 | Minh | E21B 47/017 |
| | | | 73/152.16 |
| 2016/0032717 A1* | 2/2016 | Parker | E21B 47/12 |
| | | | 324/369 |
| 2017/0248728 A1* | 8/2017 | Fouda | G01V 3/24 |

(Continued)

OTHER PUBLICATIONS

Hansen et al., "Insights from simultaneous acoustic and resistivity imaging", Apr. 8, 2016, Pennsylvania State University, pp. 191-201. (Year: 2016).*

(Continued)

*Primary Examiner* — Mohamed Charioui
(74) *Attorney, Agent, or Firm* — John W. Wustenberg; C. Tumey Law Group, PLLC

(57) ABSTRACT

Systems and methods to generate radial resistivity profiles of formations using combined measurements from omni-directional and pad-type tools are described. Measurements from a pad-type resistivity tool are obtained along a wellbore drilled through a subsurface formation. Measurements from an omni-directional resistivity tool (e.g., a dual laterolog) are also obtained. The measurements from the pad-type and omni-directional tools are then combined and used to generate a radial resistivity profile of the formation.

20 Claims, 7 Drawing Sheets

(56) References Cited

U.S. PATENT DOCUMENTS

2017/0254924 A1* 9/2017 Nikitenko ............... G01V 3/28
2018/0283168 A1 10/2018 Ranjan et al.
2020/0271820 A1 8/2020 Abdulkarim et al.

OTHER PUBLICATIONS

Lau at el., "Field Test of a HTHP Laterolog-Type Array Resistivity and ImagingWhile Drilling Tool", Jun. 15, 2019, SPWLA 60th Annual Logging Symposium, pp. 1-7. (Year: 2019).*
International Search Report and Written Opinion for International Application No. PCT/US2022/072436 dated Feb. 10, 2023.
Boyeldieu et al., "Use of the Dual Laterolog for the Evaluation of the Fracture Porosity in Hard Carbonate Formations," Offshore South East Asia Conference, Feb. 9-12, 1982, pp. 26-36.
Ellis et al., "Well Logging for Earth Scientists," Springer, 2nd Edition, 2008, pp. 104-110 and 126-129.
Tathed, "Interpretation of Galvanic Resistivity, Electromagnetic Induction, and Dielectric Dispersion Logs to Estimate Water Saturation in Organic Rich Shale," Thesis, University of Oklahoma, 2018.

* cited by examiner

SUBSURFACE FORMATION RADIAL PROFILING USING COMBINED PROCESSING OF OMNI-DIRECTIONAL AND PAD-TYPE TOOLS

FIELD OF THE DISCLOSURE

The present disclosure relates generally to hydrocarbon exploration and production, and particularly, to radial resistivity profiling of formations using omni-directional and pad-type tool measurements.

BACKGROUND

In the field of hydrocarbon exploration and production, downhole logging tools are typically used to provide an indication of the properties of rock formations surrounding a wellbore as it is drilled through the formations. An example of such a downhole logging tool is an electromagnetic ("EM") resistivity logging tool. There are different types of EM tools that may indicate the formation resistivity surrounding the borehole. A laterolog tool is one example that may work on Galvanic principles. A current is transmitted from a current electrode and returns to a far-away return electrode. Guard electrodes may help focus the current into the formation. By measuring the impedance seen at the current electrode, a resistivity measurement may be made. Another example is a microspherically focused logging tool, which operates on a similar principle as the laterolog tools, but is a pad-based shallow tool.

Yet another example is an induction tool which operates by inducing EM fields in a formation using a transmitting antenna. These fields in turn induce a voltage in a receiving antenna. Induction tools and laterolog tools have comparable resolutions and depth of investigations. However, induction tools may be more suited to resistive oil-based muds while laterolog tools may be more suited to conductive water-based muds. Resistivity imagers are pad-based tools that can produce a high-resolution resistivity image of the invaded zone surrounding the borehole by measuring the impedance seen by an array of button electrodes located on each pad. There are resistivity imagers adapted to operate specifically in water-based or oil-based muds. Dielectric tools measure the complex permittivity of the formation. Formation resistivity may be calculated as a by-product of this measurement. These tools are high-frequency, pad-based tools.

End-users demand resistivity logs with multiple depths of investigation in order to understand the extent of the invaded zone and obtain a radial profile of the formation. For example, some require at least 4 resistivity curves with different depths of investigations. The industry lacks methods by which to efficiently and cost-effectively generating such curves using existing legacy tools.

DESCRIPTION OF ILLUSTRATIVE EMBODIMENTS

Figure 1:
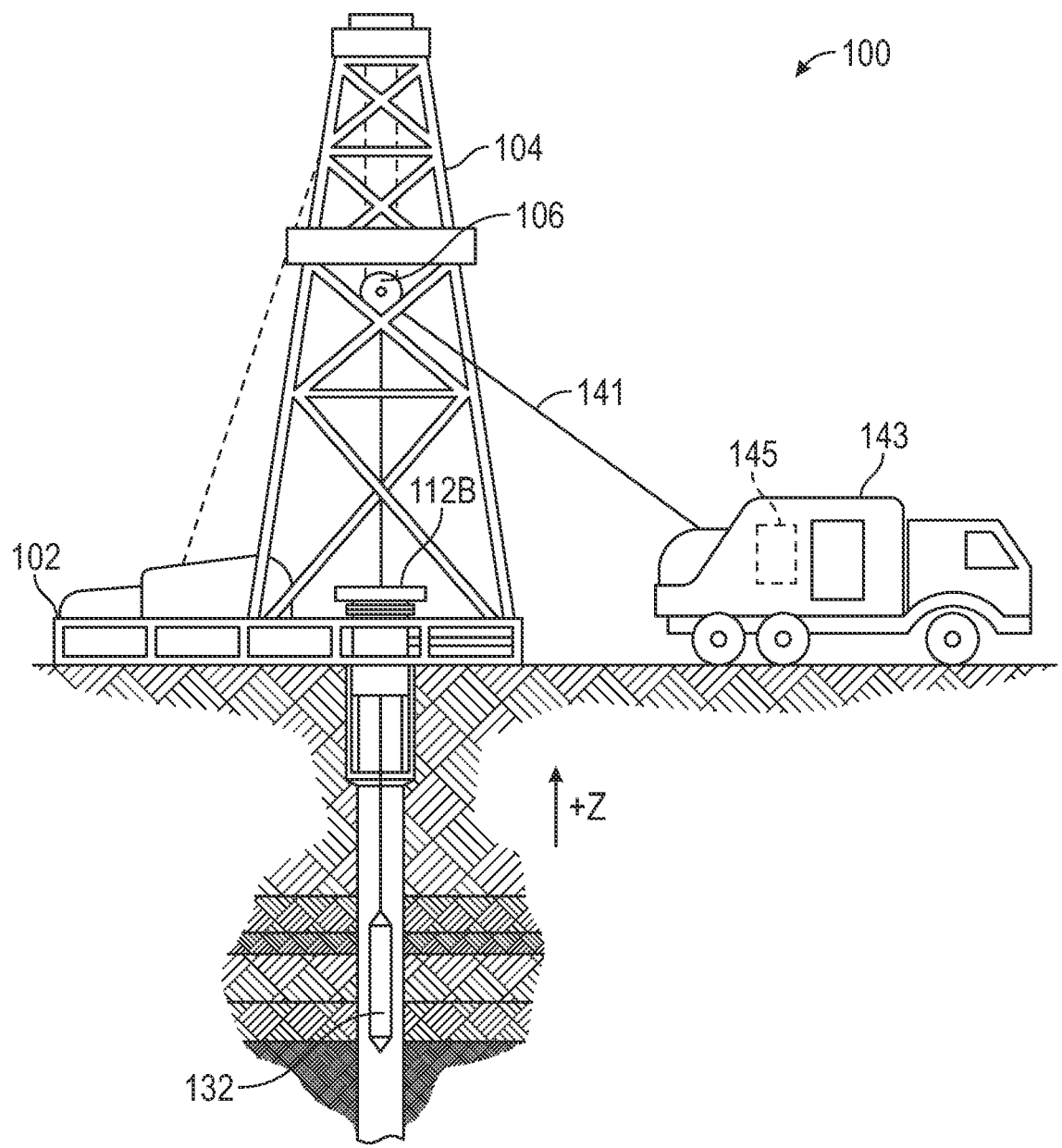
FIG. 1 is a diagram of an illustrative wireline system including a wireline tool for performing a downhole operation at a well site.

Embodiments of the present disclosure are utilized to generate a radial resistivity profile of the subsurface formation using the combined measurements. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. It would also be apparent to one of skill in the relevant art that the disclosed inversion techniques may be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

As will be described in further detail below, the present disclosure is directed to systems and method to generate radial resistivity profiles of subsurface formations using combined measurements from omni-directional and pad-type tools. In a generalized method, measurements from a pad-type resistivity tool are obtained along a wellbore drilled through a subsurface formation. Measurements from an omni-directional resistivity tool (e.g., a dual laterolog) are also obtained. The measurements from the pad-type and omni-directional tools are then combined and used to generate a radial resistivity profile of the formation.

More specifically, in the methods proposed herein, measurements from shallow single pad tools (e.g., microspherically focused logging tool or a dielectric tool) will be combined with an omni-directional tool to provide multiple depths of investigation for invaded zone profiling. Since omni-directional tools make volumetric readings without any azimuthal dependence (hence the term omni-directional), while single pad tools make readings at a certain azimuthal direction, an intermediate processing step that would match the single pad-type measurements/readings with measurements from a multiple pad tool with full circumferential coverage (e.g., a resistivity imager tool or a multiple pad dielectric tool) and extrapolating results around the tool's azimuth (again using the multiple pad tool) will be required. As an alternative embodiment, resistivity imager or multiple pad dielectric tool readings (i.e., multiple pad-type measurements) may be combined with the readings of an omnidirectional tool.

Calibration of the tools may be required. Calibration may be performed beforehand in a specific calibration environment or during logging in a sufficiently homogeneous environment. Techniques to detect such environments are disclosed herein. Further processing steps such as depth and resolution matching that are needed for combining the readings of different tools are discussed as well. Other possible alternative embodiments such as using omni-directional tools other than a dual laterolog operating in different mud environments are also presented.

The radial resistivity profiles described herein may be used to obtain a more accurate estimate of hydrocarbon saturation and the volume of hydrocarbon reserves. Also, along with information from other tools, it can assist analysts in estimating the flow characteristics of the hydrocarbon. Thus, it may be used in assessing the feasibility of the hydrocarbon production.

Illustrative embodiments and related methodologies of the present disclosure will be described below with reference to FIGS. 1-10, for example, as they might be employed in a computer system of a surface control unit of a wireline system at a well site. As will be described in further detail below, such a wireline and control system may be used to perform the disclosed radial profiling techniques for purposes of logging a wellbore through different layers of a subsurface formation. The radial profile of the subsurface formation may be used to determine the formation and invaded zone resistivity, which in turn may be used to determine the hydrocarbon saturation of different formation layers. Other features and advantages of the disclosed embodiments will be or will become apparent to one of ordinary skill in the art upon examination of the following figures and detailed description. It is intended that all such additional features and advantages be included within the scope of the disclosed embodiments.

Further, the illustrated figures are only exemplary and are not intended to assert or imply any limitation with respect to the environment, architecture, design, or process in which different embodiments may be implemented. Even though a figure may depict a vertical wellbore, unless indicated otherwise, it should be understood by one of ordinary skill in the art that the apparatus according to the present disclosure is equally well suited for use in wellbores having other orientations including horizontal wellbores, deviated or slanted wellbores, multilateral wellbores or the like. Likewise, unless otherwise noted, even though a figure may depict an onshore operation, it should be understood by those skilled in the art that the apparatus according to the present disclosure is equally well suited for use in offshore operations and vice-versa. Further, unless otherwise noted, even though a figure may depict a cased hole, it should be understood by one of ordinary skill in the art that the apparatus according to the present disclosure is equally well suited for use in open hole operations.

FIG. 1 is a diagram of an illustrative wireline system 100 including one or more downhole logging tools 132 for performing the downhole operation. As shown in FIG. 1, a platform 102 is equipped with a derrick 104 that supports a hoist 106. Hoist 106 disposes a cable 141 that is used to lower downhole tool 132 through a wellhead 112 within the wellbore. Downhole tool 132 may be one or more wireline logging tools for conducting logging operations downhole at various times during the drilling process. For example, a drill string may be removed from the wellbore periodically and downhole tool 132 may be inserted for purposes of measuring formation properties in the area surrounding the wellbore at various depths within the formation. Downhole tool 132 in this example may be one or more EM logging sondes suspended by a cable 141. Cable 141 may have conductors for transporting power to the sonde and telemetry from the sonde to the surface. Downhole tool 132 may have pads and/or centralizing springs to maintain the tool near the axis of the borehole as the tool is pulled uphole. Downhole tool 132 can include a variety of transmitters/receivers for measuring formation resistivity, etc. A logging facility 143 collects resistivity measurements from downhole tool 132, and includes a computer 145 (or some other remote computer) for processing and storing the resistivity measurements gathered by wireline logging sensors of the logging sonde.

In one or more embodiments, computer 145 may function as a surface control system of the wireline system for monitoring and controlling downhole operations at the well site. Computer 145 may be implemented using any type of computing device having at least one processor and a memory. Computer 145 may process and decode the digital signals received from a digitizer using an appropriate decoding scheme. The resulting decoded telemetry data may be further analyzed and processed by computer 145 to display useful information to a well site operator.

The processing performed by computer 145 includes generating the radial profiles described herein for determining the extent of the invaded zone and the presence of layers in the radial direction (e.g., resistivity profile). In one or more embodiments, computer 145 may be used to process data which in turn is used to make various petrophysical decisions for downhole operations performed at the respective wellsites. An example of such a system will be described in further detail below with respect to FIG. 2.

Figure 2:
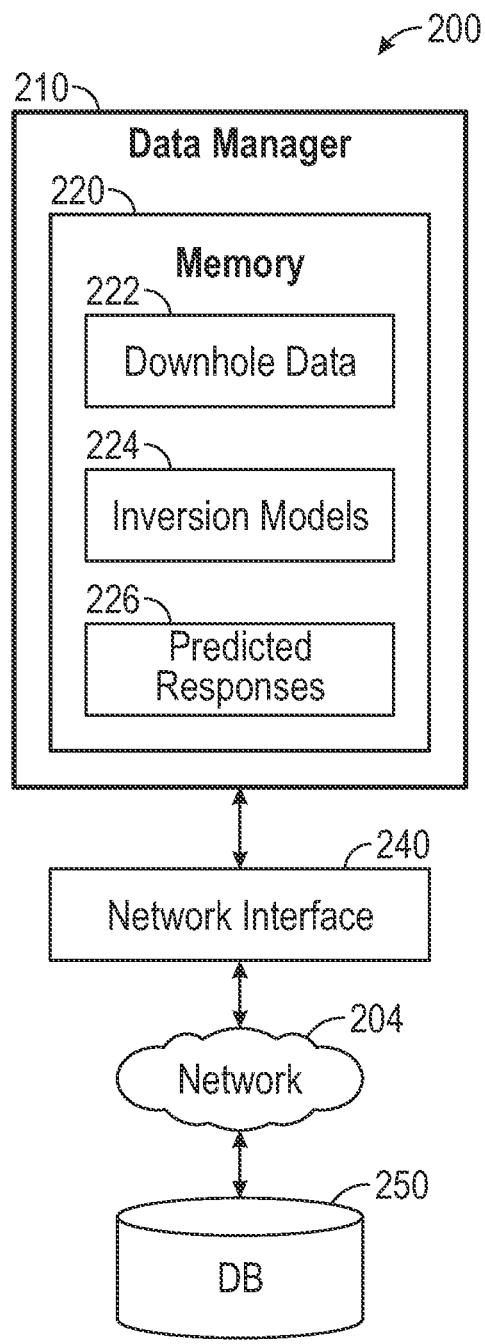
FIG. 2 is a block diagram of an illustrative system for well planning and control using geosteering inversion during downhole operations.

FIG. 2 is a block diagram of an illustrative system 200 for generating a radial resistivity profile during a downhole operation at a well site. As shown in FIG. 2, system 200 includes a data manager 210, a memory 220, a graphical user interface (GUI) (not shown), and a network interface 240. In one or more embodiments, data manager 210, memory 220, the GUI, and network interface 240 may be communicatively coupled to one another via an internal bus of system 200. Although only data manager 210, memory 220, the GUI, and network interface 240 are shown in FIG. 2, it should be appreciated that system 200 may include additional components, modules, and/or sub-components as desired for a particular implementation.

System 200 can be implemented using any type of computing device having at least one processor and a processor-readable storage medium for storing data and instructions executable by the processor. Examples of such a computing device include, but are not limited to, a mobile phone, a personal digital assistant (PDA), a tablet computer, a laptop computer, a desktop computer, a workstation, a server, a cluster of computers, a set-top box, or other type of computing device. Such a computing device may also include an input/output (I/O) interface for receiving user input or commands via a user input device (not shown). The user input device may be, for example and without limitation, a mouse, a QWERTY or T9 keyboard, a touch-screen, a graphics tablet, or a microphone. The I/O interface also may be used by the computing device to output or present information via an output device (not shown). The output device may be, for example, a display coupled to or integrated with the computing device for displaying a digital representation of the information being presented to the user. The I/O interface in the example shown in FIG. 2 may be coupled to the GUI for receiving input from a user and displaying information and content to the user based on the received input. The GUI can be any type of GUI display coupled to system 200.

As will be described in further detail below, memory 220 can be used to store information accessible by data manager 210 and any of its components for implementing the functionality of the present disclosure. Memory 220 may be any type of recording medium coupled to an integrated circuit that controls access to the recording medium. The recording medium can be, for example and without limitation, a semiconductor memory, a hard disk, or similar type of memory or storage device. In some implementations, memory 220 may be a remote data store, e.g., a cloud-based storage location, communicatively coupled to system 200 over a network 204 via network interface 240. Network 204 can be any type of network or combination of networks used to communicate information between different computing devices. Network 204 can include, but is not limited to, a wired (e.g., Ethernet) or a wireless (e.g., Wi-Fi or mobile telecommunications) network. In addition, network 204 can include, but is not limited to, a local area network, medium area network, and/or wide area network such as the Internet.

In one or more embodiments, data manager 212 may be used to obtain information relating to downhole operations being performed at a well site. Such information may include real-time measurements of formation properties collected by one or more downhole tools (e.g., downhole tool 132 of FIG. 1, as described above) as the wellbore is being logged by a wireline tool. In some implementations, the downhole tools may be electromagnetic resistivity logging tools for measuring the resistivity of the surrounding formation. The measurements may be collected over different logging points along the wellbore. The measurements from the downhole tool may be stored within memory 220 as downhole data 222.

In one or more embodiments, a forward model for the radial resistivity profile may predict responses of the combination of the downhole tools for different logging points along the wellbore, based on each of a plurality of inversion models 224. This approach is generally known as a stochastic inversion. Each inversion model may be a formation model with multiple radial layers generated by randomly sampling different sets of parameters such that the generated models cover all possible combinations of formation properties for the multiple radial formation layers of interest. In some embodiments, formation models may also include layering in the axial direction in addition to the radial direction. Such sampling may be performed using any of various statistical techniques, e.g., based on a predefined range of parameters within some probability distribution.

In one or more embodiments, inversion models 224 may be generated during the inversion operation. Alternatively, inversion models 224 and/or predicted responses 226 may have been previously generated and stored in a database (DB) 250.

In one or more embodiments, the radial resistivity profile may be used to obtain a more accurate estimate of hydrocarbon saturation and the volume of hydrocarbon reserves. Also, along with information from other tools, it may help analysts estimate the flow characteristics of the hydrocarbon. Thus, it may be used in assessing the feasibility of the hydrocarbon production.

Moreover, the radial profile may be used to perform inversion. The results of the inversion performed using the described methods may also be displayed to user 202 of system 200 via the GUI.

As previously discussed, a variety of logging tools may be used in the present disclosure. One such example is microspherically focused logging tools. These tools use the principle of spherical focusing in a compact setup in order to make shallow measurements around the borehole. An ideal electrode device in a homogeneous medium would create spherical equipotential surfaces around it. However, the presence of the borehole disrupts the equipotential surfaces and make them elongated along the borehole axis. In spherical focusing, additional bucking (or guard) electrodes are used to maintain spherical equipotential surfaces. In microspherically focused logging tools, main electrode and guard electrodes are located close to each other to obtain a shallow depth of investigation. Guard electrodes also serve the purpose of focusing current into the formation, thus reducing the effects of the borehole rugosity on the measurements. In a typical microspherically focused logging tool, at least 90% of the received signal comes from within 2 to 4 inches of the current emitting electrode. These electrodes are located on a pad that is pressed against the borehole wall which further ensures the signal coming mainly from the invaded zone. In fact, it is common practice to label measurements of the microspherically focused logging tool as Rxo—that is the resistivity of the invaded zone.

Figure 3:
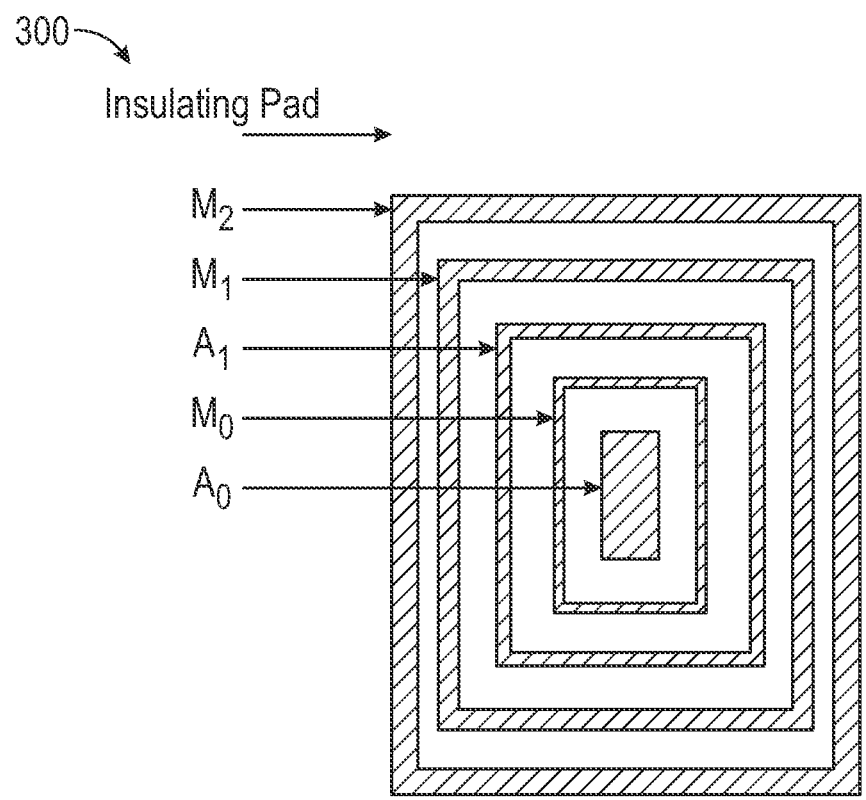
FIG. 3 is a schematic of a single pad-type logging tool.

FIG. 3 is a schematic of a microspherically focused logging tool pad 300, a single pad-type logging tool. $A_0$ is the main current emitting electrode while $A_1$ is the guard electrode. $M_0$, $M_1$ and $M_2$ are monitoring electrodes. Voltages of $M_1$ and $M_2$ are kept equal during the tool operation by adjusting the current emitted by $A_1$. Resistivity is then measured by taking the difference between the voltages of $M_0$ and $M_1/M_2$ and dividing it by the current of $A_0$.

Another example of a logging tool which can be used herein is a dielectric logging tool. Dielectric logging tools are particularly important for evaluating high-resistivity reservoirs (e.g., carbonate formations) and unconventional reservoirs (e.g., shale.) Dielectric tools are used to determine water-filled porosity and water salinity. These parameters may in turn be used to determine water saturation, water resistivity and the cementation exponent (m) in Archie's Law.

Figure 4:
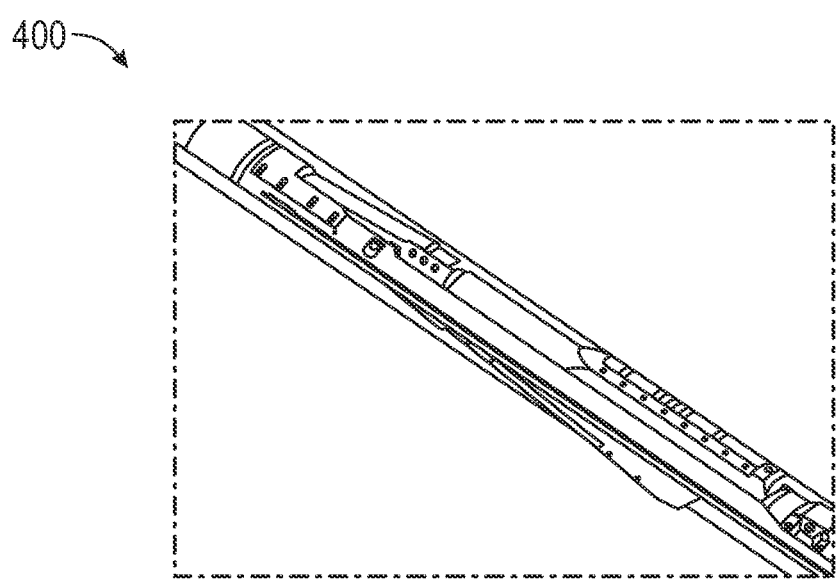
FIG. 4 illustrates an illustrative dielectric logging tool.

FIG. 4 illustrates an illustrative dielectric logging tool. This tool measures the attenuation and phase of the electromagnetic signal propagating near the borehole wall at GHz frequencies. Horn antennas may be used to transmit and receive electromagnetic waves. This dielectric tool 400 is a single pad-type tool that has two transmitters and three receivers. As a result, the dielectric tool may make measurements at multiple depths of investigation. However, dielectric tools currently in commercial operation are single pad tools and hence these measurements are from a single azimuthal location for a given depth point. Therefore, use of measurements from a single pad type tool alone does not provide full azimuthal coverage. Note that, if a multiple pad dielectric tool were to be built, it can be used in place of the resistivity imager tools that are described below as the multiple pad tool.

For determining the real part of the apparent dielectric constant and apparent resistivity from the attenuation and phase measurements, a mapping algorithm may be used. The term "apparent" here denotes this quantity is what is being measured by the tool and may not directly correspond to the properties of a single material (such as water or the rock matrix.) The apparent complex dielectric constant ($\varepsilon^*_{app}$) may then be obtained as:

$$\varepsilon^*_{app} = \varepsilon'_{app} + i\frac{1}{\omega\varepsilon_0\sigma_{ap}}, \quad \text{Eq. 1}$$

where $\omega$ is the angular frequency and $\varepsilon_0$ is the permittivity of the free space, $\sigma_{ap}$ is the apparent conductivity at the operating frequency of the tool. As mentioned above, the apparent complex dielectric constant ($\varepsilon^*_{ap}$) may not correspond to the dielectric constant of a particular material and it may in general be a function of multiple variables, which may include the following as shown in Equation 2 below: complex dielectric constant of the rock matrix ($\varepsilon^*_{ma}$), water-filled porosity ($\phi_w$), complex dielectric constant of water ($\varepsilon^*_w$), complex dielectric constant of the hydrocarbons in the formation ($\varepsilon^*_{hc}$), total porosity ($\phi_T$) and the textural parameters such as the mn texture exponent from Archie's law.

$$\varepsilon^*_{app} = M(\varepsilon^*_{ma}, \phi_w, \varepsilon^*_{hc}, \phi_T, mn, \dots) \quad \text{Eq. 2}$$

There exist rock-physics interpretation models for relating the apparent complex permittivity to these aforementioned variables. One of the most widely used such model is the complex refractive index method (CRIM) model. Other models include the complex time average (CTA) model, and the TPO model. CRIM model is shown to be highly accurate in the GHz range. Using the CRIM model, $\varepsilon^*_{app}$ may be expressed as follows:

$$\sqrt{\varepsilon^*_{app}} = \phi_w\sqrt{\varepsilon^*_w} + (1-\phi_T)\sqrt{\varepsilon^*_{ma}} + (\phi_T-\phi_w)\sqrt{\varepsilon^*_{hc}} \quad \text{Eq. 3}$$

Some of the parameters in Equation 3 may be known through other means. For example, $\phi_T$ may be obtained from nuclear (density/neutron) or NMR logs. Furthermore, complex permittivity of the water may be modeled as a function of water salinity ($X_{sal}$), pressure (P) and temperature (T) as shown in Equation 4 below. One such model is the so-called Stroud-Milton-De (SMD) model.

$$\varepsilon^*_w = W(T, X_{sal}, P) \quad \text{Eq. 4}$$

Equation 3 provides two equations (for real and imaginary parts of the complex numbers) for two unknowns ($\phi_w$ and $X_{sal}$) assuming all the other unknowns are available through supplemental measurements. These two equations may be solved to resolve the two unknowns.

Figure 5:
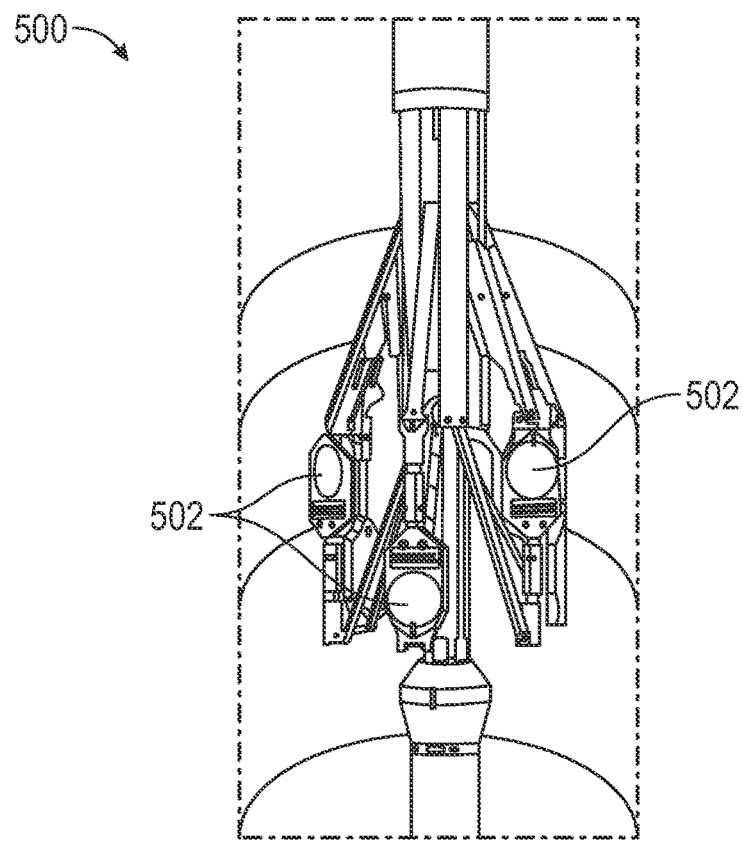
FIG. 5 depicts a multiple pad tool 500 as an example of a water based mud resistivity imager.

Yet another example of a logging tool which can be used herein are water based mud resistivity imager tools. Resistivity imagers operating in water based mud environments may obtain an image of the formation surrounding the borehole based on Galvanic principles. Generally, to obtain an image of the formation and to maximize the borehole coverage, wireline resistivity imagers contain multiple pads. These pads are pushed to the borehole wall by mechanical arms to minimize the effect of rugosity on the images. A multitude of button electrodes are located on each pad to increase the resolution of the tool. Some of the common numbers in industry for the number of pads is 6 or 8 while the number of button electrodes may be between 20 and 30. FIG. 5 depicts a multiple pad tool 500 as an example of a water based mud resistivity imager. It can be seen that there are two sets of pads 502 (only 3 shown) which are offset in the axial direction in order to maximize the borehole coverage over a wider range of borehole radii.

During operation, current is emitted by the button electrodes. The pad body also emits current to focus the currents of the button electrodes into the formation. In some cases, portion of the tool's mandrel may also emit current to improve focusing. These current traverses through the mud and formation and ends up at the return electrode. Note that focusing aims to eliminate the direct path between the button electrodes and the return electrode through the conductive mud. For resistivity imagers operating in water based mud environments, the return electrode is generally located on the mandrel. An impedance is calculated by measuring the current emitted by each button electrode as well as the voltage between each button electrode and the return electrode. These tools generally operate in the kHz range so capacitive and inductive effects may be ignored. Since the water based mud is highly conductive, the measured impedance is primarily coming from the formation and due to the low frequencies employed by the tool, impedance is mostly real. Furthermore, the mud effect is generally negligible in water based mud environments. Additional design considerations should be taken into account for resistivity imagers operating in oil based mud environments to account for the resistive muds. Oil-based mud imagers operate at higher frequencies in the MHz range to overcome the resistive mud through capacitive coupling. Return electrodes are generally located on the pad to further reduce the effect of the mud.

Resistivity imagers help determine the structural features and stratigraphy of the formation, characterize the rock texture and make facies analysis. In this sense, they serve a purpose similar to actual cores cut from the borehole wall but in a faster and continuous manner compared to traditional coring.

Another logging tool used in the present disclosure is a dual-laterolog tool. Dual-laterolog tool will be used as an example of an omni-directional tool. This is not meant to be limiting, as the methods disclosed herein may be applied to more modern array laterolog tools or induction tools. Dual laterologs operate on a focusing principle that is similar to that of microspherically focused logging tools. By electrically changing the current emission/return pattern, tool may obtain two different measurements simultaneously (or near simultaneously in some instances.) Focusing may be performed in real time in hardware; or may be performed afterwards through processing of the measured data software focusing.)

Figure 6:
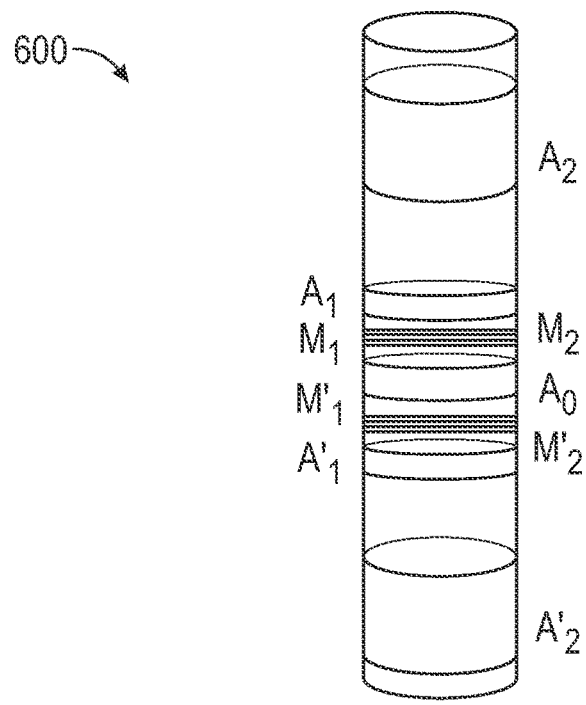
FIG. 6 is an example schematic of a dual laterolog tool.

An example schematic of a dual laterolog tool is shown in FIG. 6. In a shallow mode of operation, generally denoted as LLs, current emitted from $A_0$ and $A_1/A'_1$ of tool 600 return to $A_2/A'_2$. In the deep mode of operation, generally denoted as LLd, currents emitted from $A_0$, $A_1/A'_1$ and $A_2/A'_2$ return to a return electrode located further on the tool string from other electrodes. Monitoring electrodes $M_1/M'_1$ and $M_2/M'_2$ are kept at the same potential in both cases.

Various examples of the proposed method will now be described. In the examples presented below, a dual laterolog will be used as an example of the omnidirectional deep-reading tool that will be used in radial profiling. However, as mentioned previously, other omnidirectional tools operating on galvanic and induction principles may also be substituted in the workflows presented herein. The depth of investigation of the dual laterolog tool depends on the contrast between the formation resistivity and mud resistivity, as well as the specific design parameters of the tool itself. However, for a typical dual laterolog tool, depth of investigation of the LLs (shallow) mode may be around 25 inches, while the LLd (deep) mode may exceed 80 inches. Thus, the dual laterolog tool typically gives little information on very shallow invasion. It is desirable to obtain resistivity information from other tools, particularly those with shallower depths of investigation than that of dual laterolog to better characterize the invaded zone and the layer characteristics in the radial direction from the tool, such as the methods described herein.

In other illustrative embodiments, dual laterolog readings may be visualized together with another shallower tool such as MSFL on the same logging plot for interpreting the properties of the invaded zone. However, such a straightforward implementation would be of no use beyond giving some qualitative information due to the differences in azimuthal coverage, depth and resolution of the tools.

Two different but related workflows are presented herein that will allow a quantitative determination of the radial resistivity profile of the formation. The first workflow is shown in method 700 of FIG. 7. At block 702, depth matching of measurements between the resistivity imager (multiple pad tool), $2^{nd}$ pad type tool (single pad tool), and omnidirectional tool measurements is performed. If the measurements of the different tools are obtained in the same run, basic depth matching may be performed by using the positions of the tools on the tool string and the navigational information recorded at a reference point on the tool string. If the measurements were obtained in different runs, depth matching may be performed by correlating features of the logs for these runs. In general, gamma ray logs are obtained at each run and used for depth matching but other logs may be used for this purpose as well. Next, at block 704, a further speed correction may be performed. Speed correction accounts for uneven movement of the tool resulting in acceleration or deceleration that may be caused by stick/slip events or changes in cable tension. Measurements of the acceleration and cable tension are used in performing the speed correction.

At block 706, the data is then filtered to be put into the same resolution and same depth location. This resolution should be of the tool with the lowest resolution amount. In most cases, this would be the dual laterolog tool for the example given above. A moving average filter may be used for resolution matching purposes. Tools with higher resolution may be filtered to the resolution of the dual laterolog by convolving the filter with the samples of the tools. For example, if the tool is a resistivity imager with a 0.1 inch resolution and a 0.1 inch sampling interval, while the resolution of the dual laterolog is 2 feet and the sampling interval of the dual laterolog is 0.25 feet, a moving average filter may utilize the samples of the resistivity imager falling within ±1 feet of each dual laterolog measurement to find the corresponding effective response.

In block 708, measurements of the resistivity imager tool may be averaged in the azimuthal direction at each depth point to obtain an omnidirectional response from the imager tool. This averaging operation may constitute a simple averaging operation. In other cases, since there may be an overlap of some azimuthal measurements of the imager tool due to the inadvertent rotation of the wireline in the borehole, measurements of the imager may first be interpolated to a uniform grid in the azimuthal direction before performing the averaging operation.

Note that these steps may be performed in a different order than outlined above. For example, measurements of the resistivity imager may be averaged azimuthally first before doing any depth matching, speed correction and resolution matching steps.

In block 710, original (non-azimuthally averaged) measurements of the resistivity imager along with the measurements of another pad type tool (such as a microspherically focused logging tool or a dielectric tool) may be used to find a scaling coefficient/factor. These tools generally have a single pad design and thus they have limited coverage in the azimuthal direction. However, since they are used to make quantitative measurements which are used to predict other petrophysical quantities such as water saturation, their readings are generally well calibrated and accurate. On the other hand, resistivity imagers are generally used for qualitative analysis. This qualitative analysis may include determination of formation stratigraphy, presence of fractures and breakouts. As a result, resistivity imager measurements may not be as accurate as these other pad type tools. If microspherically focused logging tool is used as an example, to perform the scaling operation, readings of the microspherically focused logging tool may be matched with those of the resistivity imager measurements corresponding to the same azimuthal position.

Furthermore, the microspherically focused logging tool generally has a lower resolution than the resistivity imager. For example, a microspherically focused logging tool may have a resolution around 10 inches while the resistivity imager's resolution may be around 0.1 inches as previously mentioned. Thus, a resolution matching in the azimuthal direction between the two tools is required. Then, after the resolution matching, a ratio of the readings of the two tools is determined by dividing the two readings and denoted as the scaling coefficient/factor. There are several points that should be mentioned here. Firstly, it should be reemphasized that the non-azimuthally averaged samples of the resistivity imager should be used in this step. Thus, this step may be performed before the azimuthal averaging of the resistivity imager data. Furthermore, this step may be performed before measurements are resolution matched to those of the omnidirectional tool. In that case, another resolution matching step between the resistivity imager and the second pad type tool in the vertical direction would be needed. Alternatively, azimuthal and vertical matching may be performed using a single, two-dimensional filter in that case.

Next, at block 712, the computed scaling coefficient/factor may be applied to the azimuthally averaged readings of the resistivity imager. For example, if the scaling coefficient/factor is obtained by dividing the readings of the second pad type tool with the resistivity imager readings, during correction resistivity imager readings should be multiplied with the scaling coefficient/factor. Thus, a pseudo-omni directional reading for the second pad type tool (e.g. the microspherically focused logging tool or the dielectric tool) is obtained.

In block 714, scaled readings and the readings of the omnidirectional tool are combined to obtain the desired radial resistivity profile. This resistivity profile may be directly used to interpret the properties of the formation and invasion characteristics by petrophysicists or they may be used in further processing. For example, in one such processing, this radial resistivity profile may be used in an inversion process to determine the true resistivities of the radial formation layers along with their boundaries. Inversion is based on minimizing a cost function which is a measure of the misfit between the obtained resistivity profile and a given model of the electromagnetic response of the formation.

A stochastic inversion or a more traditional inversion may be used for this purpose. Stochastic inversion has been described previously. Equation 5 represents what traditional inversion does in a concise form. In this equation, $\bar{R}_{Meas}$ denotes the resistivity vector obtained by following the processing steps described in this disclosure to combine the measurements of different tools. $\bar{R}_{Model}$ denotes the response predicted by an electromagnetic model. This model may be an analytical model or a numerical model obtained with a simulation tool. Such a simulation tool may make use of algorithms such as the Finite Element Method (FEM) or Finite Difference Time Domain method (FDTD.) Overbars denote the vector nature of these quantities. $\overline{X}$ denotes the parameters of the model which may include resistivities of the layers of the formation and their radial distances from the borehole as mentioned above. Some other parameters of the model may already be known and may be fixed to this known value. Examples of such parameters may include mud resistivity and the borehole diameter. Any of the inversion algorithms established in literature such as the Levenberg-Marquardt algorithm may be used for performing the inversion. Further regularization terms may be added to the cost function to make the solution well-behaved based on a priori information or constraints on parameters.

$$\arg_{\overline{X}}\min\|\overline{R}_{Meas}-\overline{R}_{Model}(\overline{X})\| \qquad \text{Eq. 5.}$$

Figure 8:
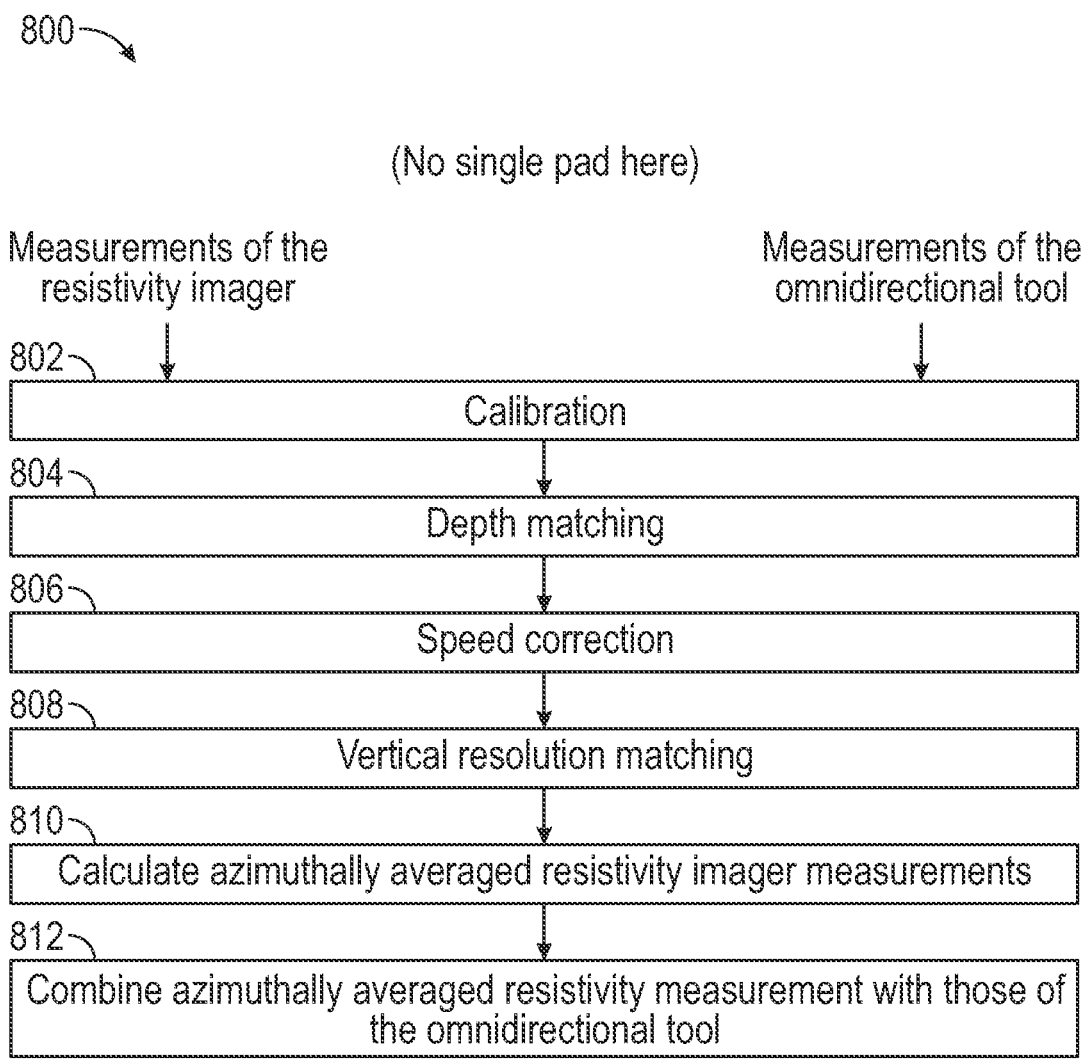

In a simpler variation of the above workflow as reflected in the flowchart of FIG. 8, azimuthally averaged resistivity readings from the resistivity imager may be directly used along with the omnidirectional tool without scaling the readings of the resistivity imager with a second pad type tool. In method 800, to improve the accuracy of the resistivity imager readings and its fidelity to the measurements of the omnidirectional tool, a calibration step may be performed at block 802. This calibration may be performed using a dedicated calibrator. For example, calibrator may be a test tank filled with a homogeneous fluid. In other cases, calibration may be performed in a formation zone that is known to be thick, relatively homogeneous and with low permeability. Such zones may be automatically detected, for example based on the readings of an omnidirectional resistivity tool. Sharp changes in such a log may be used to detect vertical formation boundaries. The variation of the readings within a formation layer may then be used to estimate its homogeneity. Alternatively, resistivity imager data may be used to determine relatively homogeneous formation layers. In this example, the depth matching (block 804), speed correction (block 806) and vertical resolution matching (block 808) are performed as described in flowchart 700.

Azimuthally averaged resistivity imager measurements are determined at block 810 and may be used to determine formation boundaries while the overall variation of the measurements within a formation layer determine its homogeneity. Formation core samples or NMR logs may be used to determine formation permeability which in turn indicates whether the formation is invaded with the mud fluid. Once a suitable formation layer is found, the azimuthally averaged readings of the resistivity imager may be scaled to match to the readings of the omnidirectional tool in that layer and the same scaling may be used throughout the rest of the log. In this example, the rest of the workflow (such as the combination of the averaged resistivity measurements and those of the omnidirectional tool at block 812) exactly follows that explained in FIG. 7. This second approach may be easier but may yield lower accuracy.

Two alternative workflows and some possible variations on these workflows have been presented above. As a further alternative, it may be possible to combine both workflows. In this case, a scaled and azimuthally averaged resistivity imager measurement may be used to scale a second pad type tool. Then, the scaled measurement corresponding to the second pad type tool (e.g., measurements of the resistivity imager scaled using the microspherically focused logging tool or the dielectric tool as described in the workflow shown in FIG. 7) and the non-scaled measurement (obtained by averaging calibrated resistivity imager measurements as described in the workflow shown in FIG. 8) may provide information on different depths of investigation. These two measurements may then be combined with a deeper reading omnidirectional tool to perform radial profiling.

Figure 7:
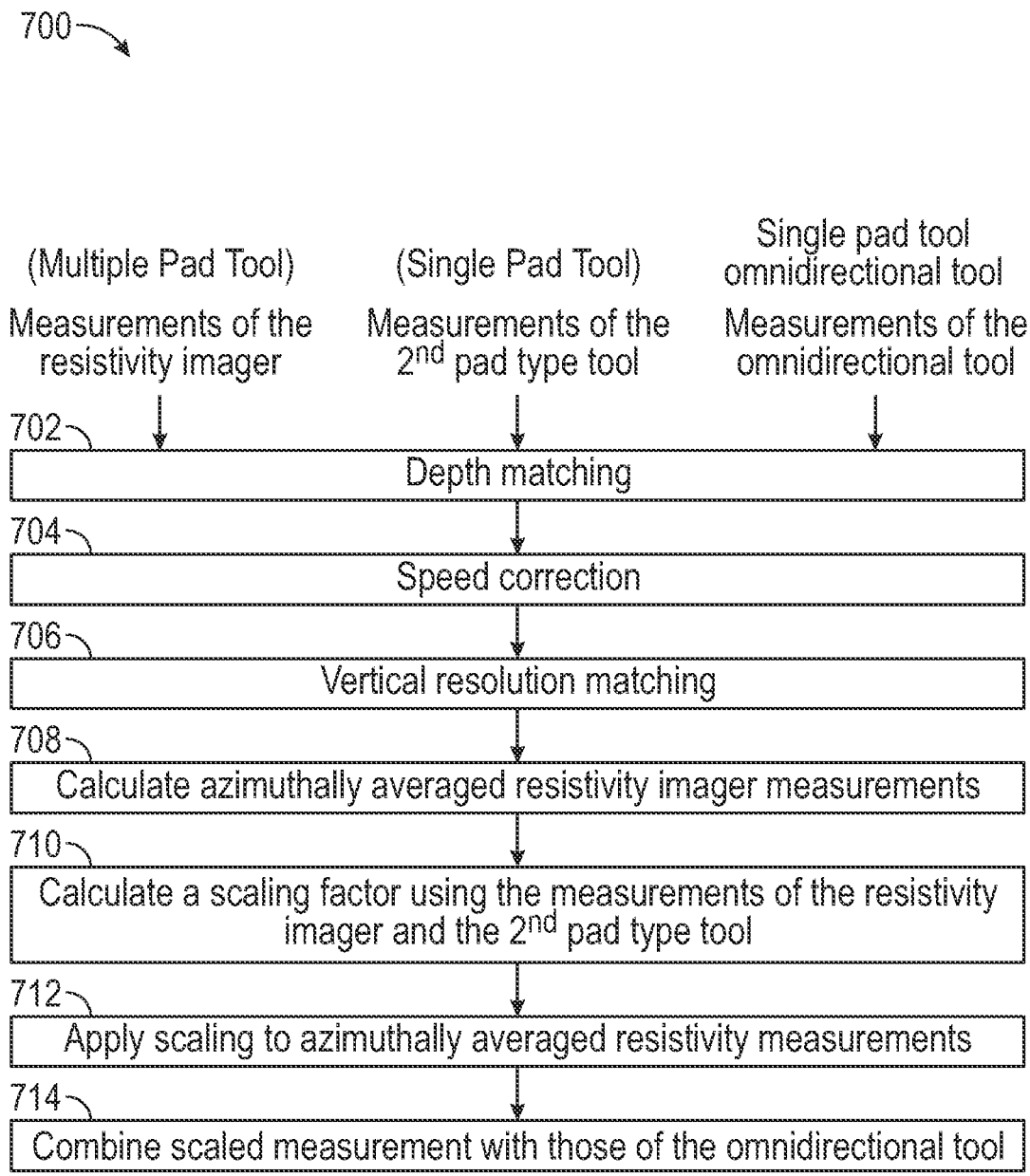
FIGS. 7, 8 and 9 are flowcharts of illustrative methods to generate resistivity profiles, according to illustrative methods of the present disclosure.

In a related embodiment, the workflow depicted in FIG. 7 may be used to obtain scaled measurements corresponding to two or more pad type tools. For example, measurements from a dielectric tool and a microspherically focused logging tool may be scaled this way. Resulting scaled measurements will correspond to different depths of investigation and may be used in radial profiling.

Although examples were given for a water based mud environment, presented techniques may also be applied to oil based mud environments. As previously mentioned, oil based mud resistivity imagers have some design modifications compared to water based mud resistivity imagers. To overcome the resistive oil based mud and measure the resistivity of the formation, a capacitive contact with the formation may be established. To obtain a capacitive contact, an oil based mud resistivity imager may operate at higher frequencies than a water based mud resistivity imager. As a consequence, the measured signal may be strongly affected by formation permittivity. Thus, an inversion may be applied to the measurements of the oil based mud imager to determine the formation resistivity. Note that, the output of such an inversion may be plugged in as an input to the workflows described in FIG. 7 and FIG. 8 without any change in the processing.

As mentioned previously, examples of omnidirectional tools include tools operating on Galvanic principles such as dual laterolog and array laterolog or induction principles such as an array induction tool. In general, tools operating on Galvanic principles require a conductive path to the formation so they are more suitable for water based mud environments, while response of the induction tools is most influenced from highly conductive layers so they are better suited to oil based mud environments (for which, the low conductivity of the oil based mud means the primary contribution to the tool's response is coming from the formation).

Figure 9:
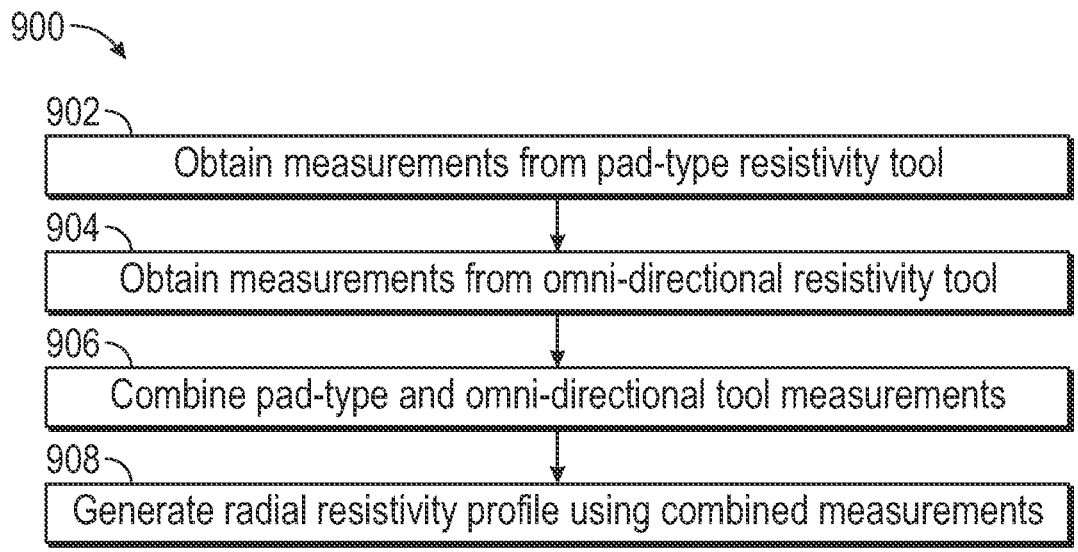

FIG. 9 is a flowchart of an illustrative general workflow 900 to generate a radial resistivity profile of a subsurface formation. At block 902, measurements are obtained from a pad-type resistivity tool positioned along a wellbore drilled through a subsurface formation. At block 904, measurements are obtained from an omni-directional resistivity tool positioned along the wellbore. At block 906, the measurements from the pad-type and omni-directional tools are combined. At block 908, a radial resistivity profile of the subsurface formation is generated using the combined measurements.

Figure 10:
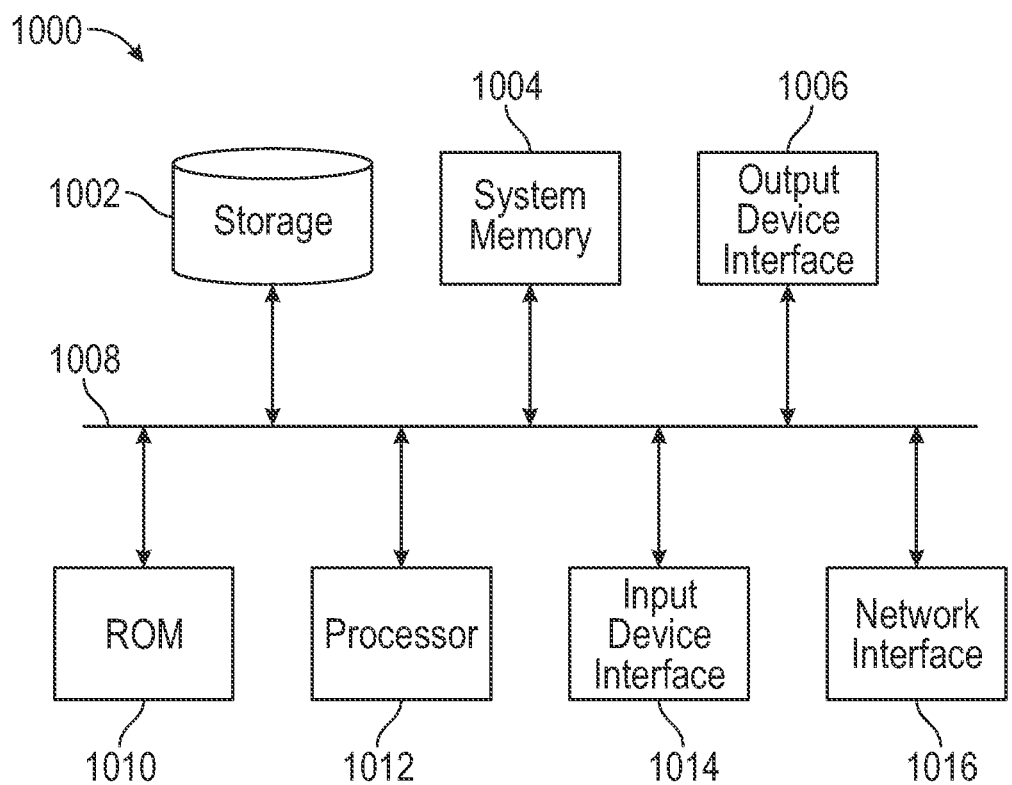
FIG. 10 is a block diagram of an illustrative computer system in which embodiments of the present disclosure may be implemented.

FIG. 10 is a block diagram of an illustrative computer system 1000 in which embodiments of the present disclosure may be implemented. For example, any of the workflows described above, as well as system 200 of FIG. 2 may be implemented using system 1000. System 1000 may be a desktop or personal computer, smartphone, tablet, or any other type of electronic device. Such an electronic device includes various types of computer readable media and interfaces for various other types of computer readable media. As shown in FIG. 10, system 1000 includes a permanent storage device 1002, a system memory 1004, an output device interface 1006, a system communications bus 1008, a read-only memory (ROM) 1010, processing unit(s) 1012, an input device interface 1014, and a network interface 1016.

Bus 1008 collectively represents all system, peripheral, and chipset buses that communicatively connect the numerous internal devices of system 1000. For instance, bus 1008 communicatively connects processing unit(s) 1012 with ROM 1010, system memory 1004, and permanent storage device 1002. From these various memory units, processing unit(s) 1012 retrieves instructions to execute and data to process in order to execute the processes of the subject disclosure. The processing unit(s) can be a single processor or a multi-core processor in different implementations.

ROM 1010 stores static data and instructions that are needed by processing unit(s) 1012 and other modules of system 1000. Permanent storage device 1002, on the other hand, is a read-and-write memory device. This device is a non-volatile memory unit that stores instructions and data even when system 1000 is off. Some implementations of the subject disclosure use a mass-storage device (such as a magnetic or optical disk and its corresponding disk drive) as permanent storage device 1002.

Other implementations use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such a random access memory. System memory 1004 stores some of the instructions and data that the processor needs at runtime. In some implementations, the processes of the subject disclosure are stored in system memory 1004, permanent storage device 1002, and/or ROM 1010. For example, the various memory units include instructions for computer aided pipe string design based on existing string designs in accordance with some implementations. From these various memory units, processing unit(s) 1012 retrieves instructions to execute and data to process in order to execute the processes of some implementations.

Bus 1008 also connects to input and output device interfaces 1014 and 1006. Input device interface 1014 enables the user to communicate information and select commands to the system 1000. Input devices used with input device interface 1014 include, for example, alphanumeric, QWERTY, or T9 keyboards, microphones, and pointing devices (also called "cursor control devices"). Output device interfaces 1006 enables, for example, the display of images generated by the system 1000. Output devices used with output device interface 1006 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 10, bus 1008 also couples system 1000 to a public or private network (not shown) or combination of networks through a network interface 1016. Such a network may include, for example, a local area network ("LAN"), such as an Intranet, or a wide area network ("WAN"), such as the Internet. Any or all components of system 1100 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, instructions for performing processes/workflows described above, may be implemented using system 1000 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

Methods and embodiments described herein further relate to any one or more of the following paragraphs:

1. A computer-implemented method to generate a radial resistivity profile of a subsurface formation, the method comprising obtaining measurements from a pad-type resistivity tool positioned along a wellbore drilled through a subsurface formation; obtaining measurements from an omni-directional resistivity tool positioned along the wellbore; combining the measurements from the pad-type and omni-directional resistivity tools; and generating a radial resistivity profile of the subsurface formation using the combined measurements.

2. The computer-implemented method as defined in paragraph 1, wherein the pad-type resistivity tool comprises a multiple pad tool and a single pad tool; or a multiple pad tool.

3. The computer-implemented method as defined in paragraphs 1 or 2, wherein: the pad-type resistivity tool is a water-based mud resistivity imager, oil-based mud resistivity imager, dielectric tool or a microspherically focused logging tool; and the omni-directional resistivity tool is a dual laterolog, array laterolog or an array induction tool.

4. The computer-implemented method as defined in any of paragraphs 1-3, wherein generating the radial resistivity profile comprises applying depth matching to the pad-type and omni-directional resistivity measurements.

5. The computer-implemented method as defined in any of paragraphs 1-4, wherein generating the radial resistivity profile further comprises applying resolution matching to the pad-type and omni-directional resistivity measurements.

6. The computer-implemented method as defined in any of paragraphs 1-5, wherein: the pad-type resistivity tool comprises a multiple pad resistivity tool; and generating the radial resistivity profile further comprises averaging the multiple pad resistivity measurements over an azimuthal direction.

7. The computer-implemented method as defined in any of paragraphs 1-6, wherein generating the radial resistivity profile further comprises combining the averaged azimuthal measurements with the omni-directional resistivity measurements.

8. The computer-implemented method as defined in any of paragraphs 1-7, further comprising: scaling the averaged azimuthal measurements using a scaling factor calculated from measurements of a single pad tool and the multiple pad resistivity tool; and combining the scaled measurement with measurements of the omni-directional tool to generate the resistivity profile.

9. The computer-implemented method as defined in any of paragraphs 1-8, wherein scaling the average azimuthal measurements comprises filtering non-averaged azimuthal measurements to match an azimuthal position of the single pad tool to calculate a scaling coefficient; and applying the scaling coefficient to the averaged azimuthal measurements.

10. The computer-implemented method as defined in any of paragraphs 1-9, wherein: the pad-type resistivity and omni-directional tools are calibrated using a dedicated calibrator; or the pad-type resistivity and omni-directional tools are calibrated in-situ.

11. The computer-implemented method as defined in any of paragraphs 1-10, wherein an inversion is applied to the combined measurements to determine radial boundaries and resistivities of layers of the formation.

12. The computer-implemented method as defined in any of paragraphs 1-11, wherein the tools are calibrated in-situ in a homogeneous formation, layers of the homogeneous formation being determined based upon a variation of measurements within the layers.

13. The computer-implemented method as defined in any of paragraphs 1-12, further comprising adjusting a planned path of the wellbore for one or more subsequent stages of a downhole operation, based upon the radial resistivity profile.

14. A system comprising a processor; and a memory coupled to the process having instructions stored therein, which, when executed by the processor, causes the process to perform a plurality of functions, including functions to: obtain measurements from a pad-type resistivity tool positioned along a wellbore drilled through a subsurface formation; obtain measurements from an omni-directional resistivity tool positioned along the wellbore; combine the measurements from the pad-type and omni-directional resistivity tools; and generate a radial resistivity profile of the subsurface formation using the combined measurements.

15. The system as defined in paragraph 14, wherein the pad-type resistivity tool comprises a multiple pad tool and a single pad tool; or a multiple pad tool.

16. The system as defined in paragraphs 14 or 15, wherein generating the radial resistivity profile comprises applying depth matching to the pad-type and omni-directional resistivity measurements.

Moreover, the methods described herein may be embodied within a system comprising processing circuitry to implement any of the methods, or a in a non-transitory computer-readable medium comprising instructions which, when executed by at least one processor, causes the processor to perform any of the methods described herein.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method to generate a radial resistivity profile of a subsurface formation, the method comprising:
    obtaining measurements from a pad-type resistivity tool positioned along a wellbore drilled through a subsurface formation, wherein the pad-type resistivity tool is a water-based mud resistivity imager, oil-based mud resistivity imager, dielectric tool, or a microspherically focused logging tool;
    obtaining measurements from an omni-directional resistivity tool positioned along the wellbore;
    combining the measurements from the pad-type and omni-directional resistivity tools by at least matching a depth or a resolution of the measurements from the pad-type and omni-directional resistivity tools; and
    generating a radial resistivity profile of the subsurface formation using the combined measurements.

2. The computer-implemented method as defined in claim 1, wherein the pad-type resistivity tool comprises:
    a multiple pad tool and a single pad tool; or
    a multiple pad tool.

3. The computer-implemented method as defined in claim 1, wherein:
    the omni-directional resistivity tool is a dual laterolog, array laterolog or an array induction tool.

4. The computer-implemented method as defined in claim 1, wherein generating the radial resistivity profile comprises applying depth matching to the pad-type and omni-directional resistivity measurements.

5. The computer-implemented method as defined in claim 4, wherein generating the radial resistivity profile further comprises applying resolution matching to the pad-type and omni-directional resistivity measurements.

6. The computer-implemented method as defined in claim 5, wherein:
    the pad-type resistivity tool comprises a multiple pad resistivity tool; and
    generating the radial resistivity profile further comprises averaging the multiple pad resistivity measurements over an azimuthal direction.

7. The computer-implemented method as defined in claim 6, wherein generating the radial resistivity profile further comprises combining the averaged azimuthal measurements with the omni-directional resistivity measurements.

8. The computer-implemented method as defined in claim 6, further comprising:
    scaling the averaged azimuthal measurements using a scaling factor calculated from measurements of a single pad tool and the multiple pad resistivity tool; and
    combining the scaled measurement with measurements of the omni-directional tool to generate the resistivity profile.

9. The computer-implemented method as defined in claim 8, wherein scaling the average azimuthal measurements comprises:
    filtering non-averaged azimuthal measurements to match an azimuthal position of the single pad tool to calculate a scaling coefficient; and
    applying the scaling coefficient to the averaged azimuthal measurements.

10. The computer-implemented method as defined in claim 1, wherein:
    the pad-type resistivity and omni-directional tools are calibrated using a dedicated calibrator; or
    the pad-type resistivity and omni-directional tools are calibrated in-situ.

11. The computer-implemented method as defined in claim 1, wherein an inversion is applied to the combined measurements to determine radial boundaries and resistivities of layers of the formation.

12. The computer-implemented method as defined in claim 10, wherein the tools are calibrated in-situ in a homogeneous formation, layers of the homogeneous formation being determined based upon a variation of measurements within the layers.

13. The computer-implemented method as defined in claim 1, further comprising adjusting a planned path of the wellbore for one or more subsequent stages of a downhole operation, based upon the radial resistivity profile.

14. A system comprising:
    a processor; and
    a memory coupled to the process having instructions stored therein, which, when executed by the processor, causes the process to perform a plurality of functions, including functions to:
        obtain measurements from a pad-type resistivity tool positioned along a wellbore drilled through a subsurface formation, wherein the pad-type resistivity tool is a water-based mud resistivity imager, oil-based mud resistivity imager, dielectric tool, or a microspherically focused logging tool;
        obtain measurements from an omni-directional resistivity tool positioned along the wellbore;
        combine the measurements from the pad-type and omni-directional resistivity tools by at least matching a depth or a resolution of the measurements from the pad-type and omni-directional resistivity tools; and
        generate a radial resistivity profile of the subsurface formation using the combined measurements.

15. The system as defined in claim 14, wherein the pad-type resistivity tool comprises:
    a multiple pad tool and a single pad tool; or
    a multiple pad tool.

16. The system as defined in claim 14, wherein generating the radial resistivity profile comprises applying depth matching to the pad-type and omni-directional resistivity measurements.

17. A non-transitory computer-readable storage medium having instructions stored therein, which, when executed by a computer, cause the computer to perform a plurality of functions, including functions to:
- obtain measurements from a pad-type resistivity tool positioned along a wellbore drilled through a subsurface formation, wherein the pad-type resistivity tool is a water-based mud resistivity imager, oil-based mud resistivity imager, dielectric tool, or a microspherically focused logging tool;
- obtain measurements from an omni-directional resistivity tool positioned along the wellbore;
- combine the measurements from the pad-type and omni-directional resistivity tools by at least matching a depth or a resolution of the measurements from the pad-type and omni-directional resistivity tools; and
- generate a radial resistivity profile of the subsurface formation using the combined measurements.

18. The computer-readable storage medium as defined in claim 17, wherein the pad-type resistivity tool comprises:
- a multiple pad tool and a single pad tool; or
- a multiple pad tool.

19. The computer-readable storage medium as defined in claim 17, wherein generating the radial resistivity profile comprises applying depth matching to the pad-type and omni-directional resistivity measurements.

20. The computer-readable storage medium as defined in claim 17, further comprising assessing a feasibility of a hydrocarbon production plan based upon the radial resistivity profile.

* * * * *